United States Patent
Kim et al.

(10) Patent No.: US 11,424,511 B2
(45) Date of Patent: Aug. 23, 2022

(54) ELECTRODE ASSEMBLY AND ELECTROCHEMICAL DEVICE COMPRISING ELECTRODE ASSEMBLY

(71) Applicant: LG CHEM, LTD., Seoul (KR)

(72) Inventors: Chan-Jong Kim, Daejeon (KR); Myeong-Soo Kim, Daejeon (KR); In-Hyouk Sung, Daejeon (KR); Su-Jin Yoon, Daejeon (KR); Sang-Joon Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 130 days.

(21) Appl. No.: 16/475,897

(22) PCT Filed: Oct. 18, 2018

(86) PCT No.: PCT/KR2018/012362
§ 371 (c)(1),
(2) Date: Jul. 3, 2019

(87) PCT Pub. No.: WO2019/078649
PCT Pub. Date: Apr. 25, 2019

(65) Prior Publication Data
US 2019/0348655 A1 Nov. 14, 2019

(30) Foreign Application Priority Data
Oct. 20, 2017 (KR) ......................... 10-2017-0136462

(51) Int. Cl.
*H01M 50/46* (2021.01)
*H01M 10/052* (2010.01)
(Continued)

(52) U.S. Cl.
CPC ....... *H01M 50/461* (2021.01); *H01M 10/052* (2013.01); *H01M 50/411* (2021.01); *H01M 50/446* (2021.01)

(58) Field of Classification Search
None
See application file for complete search history.

(56) References Cited

U.S. PATENT DOCUMENTS

2002/0055038 A1 5/2002 Aihara et al.
2008/0292968 A1 11/2008 Lee et al.
(Continued)

FOREIGN PATENT DOCUMENTS

CN 107004812 A 8/2017
EP 2833438 A1 2/2015
(Continued)

OTHER PUBLICATIONS

Extended European Search Report from the European Patent Office dated Apr. 9, 2020 in a corresponding European patent application No. 18868339.5.
(Continued)

*Primary Examiner* — Daniel S Gatewood
(74) *Attorney, Agent, or Firm* — Morgan, Lewis & Bockius LLP (57) ABSTRACT

Disclosed is an electrode assembly including two electrodes having polarities opposite to each other, and a separator interposed between the two electrodes, wherein the separator includes: a separator base which includes a porous polymer substrate having a plurality of pores, and a porous coating layer; and an adhesive layer formed on at least one surface of the separator base, provided to face either of the electrodes and containing an adhesive resin, and wherein the adhesion (Peel Strength) between the porous polymer substrate and the porous coating layer and the adhesion (Lami Strength) between the adhesive layer and the electrode satisfy Mathematical Formula 1. An electrochemical device including the separator is also disclosed. In the electrode assembly, the separator shows increased resistance against (Continued)

scratching and the adhesion between the separator and the electrode can be improved.

19 Claims, 5 Drawing Sheets

(51) Int. Cl.
  *H01M 50/411* (2021.01)
  *H01M 50/446* (2021.01)

(56) References Cited

U.S. PATENT DOCUMENTS

| | | | |
|---|---|---|---|
| 2012/0094184 A1* | 4/2012 | Abe | H01G 9/02 |
| | | | 429/251 |
| 2013/0101885 A1* | 4/2013 | Lee | H01M 10/0525 |
| | | | 429/144 |
| 2013/0216892 A1 | 8/2013 | Matsuura et al. | |
| 2013/0224556 A1 | 8/2013 | Hong et al. | |
| 2014/0349169 A1 | 11/2014 | Mizuno et al. | |
| 2015/0030905 A1 | 1/2015 | Mizuno et al. | |
| 2015/0162588 A1* | 6/2015 | Lee | H01M 50/431 |
| | | | 429/145 |
| 2015/0228949 A1 | 8/2015 | Mizuno et al. | |
| 2015/0303427 A1 | 10/2015 | Hyun et al. | |
| 2015/0311490 A1 | 10/2015 | Murase et al. | |
| 2015/0333311 A1* | 11/2015 | Kim | H01M 50/403 |
| | | | 429/145 |
| 2016/0226051 A1* | 8/2016 | Lee | H01M 50/403 |
| 2017/0222280 A1 | 8/2017 | Asano et al. | |
| 2017/0338459 A1 | 11/2017 | Takahiro et al. | |
| 2018/0040868 A1 | 2/2018 | Jang et al. | |

FOREIGN PATENT DOCUMENTS

| | | | |
|---|---|---|---|
| JP | 2014/081035 A1 | | 5/2014 |
| JP | 2017-27852 A | | 2/2017 |
| JP | 2017027852 A | * | 2/2017 |
| KR | 10-0727247 B1 | | 6/2007 |
| KR | 10-1298340 B1 | | 8/2013 |
| KR | 10-2013-0099543 A | | 9/2013 |
| KR | 10-2013-0136149 A | | 12/2013 |
| KR | 10-2014-0091107 A | | 7/2014 |
| KR | 10-2016-0108116 A | | 9/2016 |
| KR | 10-2016-0125921 A | | 11/2016 |
| KR | 10-2016-0130715 A | | 11/2016 |
| KR | 10-2016-0136089 A | | 11/2016 |
| KR | 10-2017-0019522 A | | 2/2017 |
| KR | 10-2017-0112250 A | | 10/2017 |
| WO | 2014/030899 A1 | | 2/2014 |

OTHER PUBLICATIONS

International Search Report dated Jan. 28, 2019, issued in corresponding International Application No. PCT/KR2018/012362.

* cited by examiner

ELECTRODE ASSEMBLY AND ELECTROCHEMICAL DEVICE COMPRISING ELECTRODE ASSEMBLY

TECHNICAL FIELD

The present disclosure relates to an electrode assembly which may be applied to an electrochemical device, such as a lithium secondary battery, and an electrochemical device including the same.

The present application claims priority to Korean Patent Application No. 10-2017-0136462 filed on Oct. 20, 2017 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous coating layer formed by applying a mixture of an excessive amount of inorganic particles and a binder polymer onto at least one surface of a porous substrate having a plurality of pores.

Meanwhile, in order to increase the adhesion between a separator and an electrode, an adhesive layer has been introduced onto a porous coating layer. Herein, the adhesion between a porous polymer substrate and a porous coating layer is defined as Peel Strength (Ps) and the adhesion between an electrode and the outermost surface (porous coating layer or adhesive layer) of a separator facing the electrode is defined as Lami Strength (Ls).

According to the related art, in order to further increase the adhesion between a separator and an electrode, a method for increasing the Lami Strength has been focused. In the case of Peel Strength, it is maintained merely to such a level that separation of the inorganic particles in a porous coating layer may be prevented.

However, when the loading amount of adhesive slurry is increased to increase the Lami Strength, the thickness of the adhesive layer is increased and the content of a binder polymer is also increased to cause a problem of pore blocking. Thus, the resistance of the separator is increased and the output characteristics are degraded undesirably.

Figure 1:
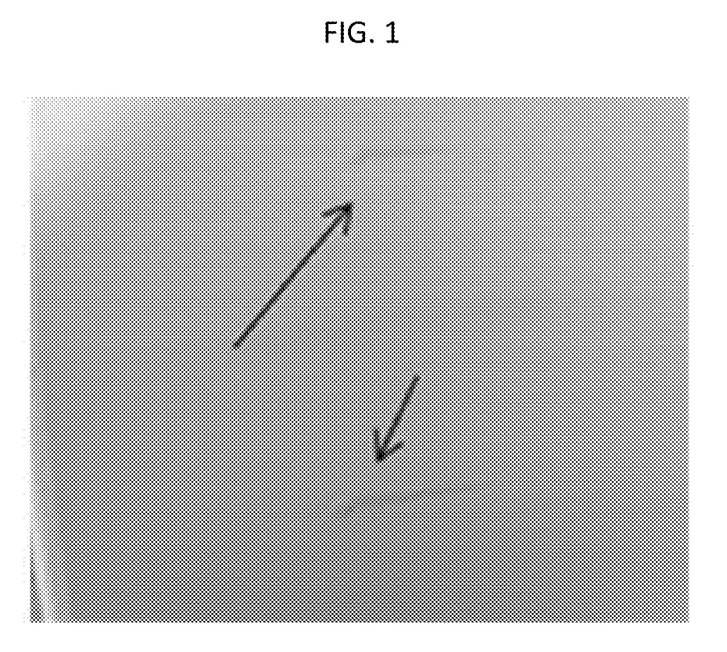
FIG. 1 is a photograph showing that the scratches phenomena occur on the surface of the separator according to Comparative Example 2.
Figure 2:
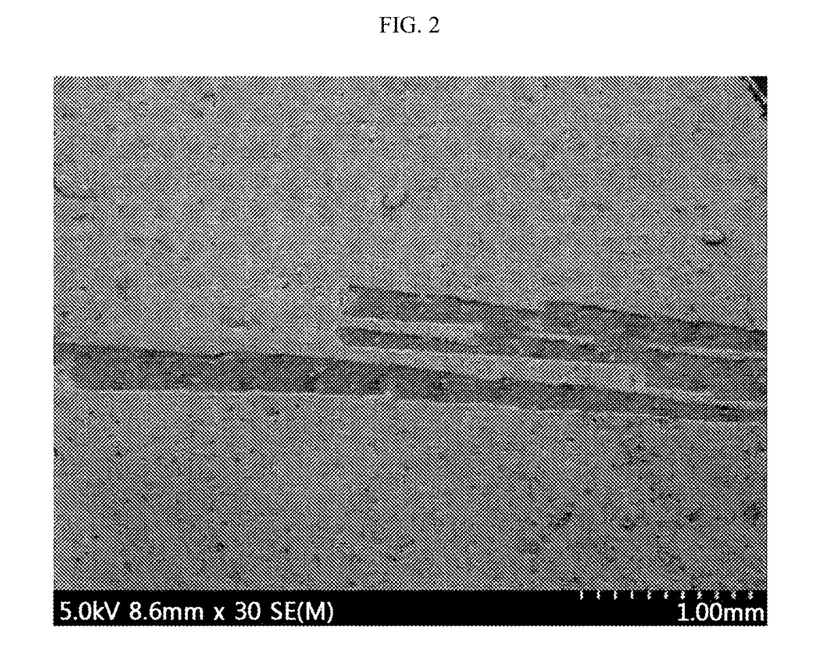
FIG. 2 shows a scanning electron microscopic (SEM) image illustrating the scratch part in FIG. 1.
Figure 3:
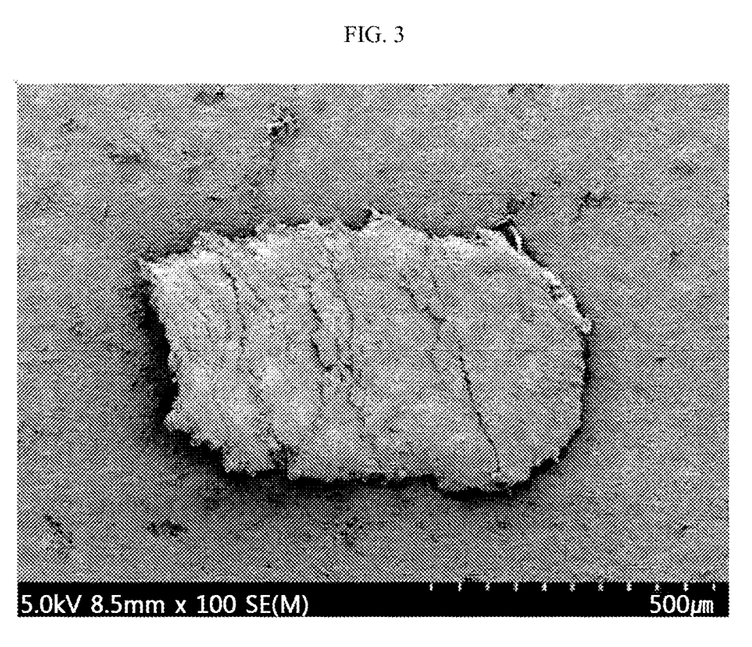
FIG. 3 shows a scanning electron microscopic (SEM) image illustrating the protrudent body in FIG. 2.

Meanwhile, even though the Peel Strength is maintained at a predetermine level, there are problems in that the electrode and the separator are not adhered to each other or the separator surface is scratched (FIG. 1 and FIG. 2). When the separator is scratched, the voltage may be decreased. In addition, there are problems in that the scratches protrude from the folded electrode surface (FIG. 3) to cause defects in electrode assemblies or contamination of the related system with the coating layer.

DISCLOSURE

Technical Problem

The present disclosure is designed to solve the problems of the related art, and the inventors of the present disclosure have found that when the Peel Strength is increased to be higher than the Lami Strength, the Lami Strength is also increased despite the same loading amount of adhesive slurry. As a result, it is possible to increase the adhesion between an electrode and a separator. In addition, it has been found that when the Peel Strength is higher than the Lami Strength, resistance against scratching or peeling on the surface of a separator is increased.

The present disclosure is based on these findings.

Therefore the present disclosure is directed to providing an electrode assembly which has excellent resistance against scratching on the surface of a separator and having high adhesion between a separator and an electrode despite the same loading amount of adhesive slurry.

The present disclosure is also directed to providing an electrochemical device including the electrode assembly.

Technical Solution

In one aspect of the present disclosure, there is provided an electrode assembly according to the following embodiment.

According to the first embodiment of the present disclosure, there is provided an electrode assembly including two electrodes having polarities opposite to each other, and a separator interposed between the two electrodes, wherein the separator includes:

a separator base which includes a porous polymer substrate having a plurality of pores, and a porous coating layer formed on at least one surface of the porous polymer substrate and containing a plurality of inorganic particles and a binder polymer positioned on the whole or a part of the surface of the inorganic particles to connect the inorganic particles with each other and fix them; and an adhesive layer formed on at least one surface of the separator base, provided to face either of the electrodes and containing an adhesive resin, and wherein the adhesion (Peel Strength) between the porous polymer substrate and the porous coating layer and the adhesion (Lami Strength) between the adhesive layer and the electrode satisfy the following Mathematical Formula 1:

1.10≤(Peel Strength)/(Lami Strength)≤2.1 [Mathematical Formula 1]

In another aspect of the present disclosure, there is provided an electrode assembly according to the following embodiment.

According to the second embodiment of the present disclosure, there is provided an electrode assembly including two electrodes having polarities opposite to each other, and a separator interposed between the two electrodes, wherein the separator includes:

a porous polymer substrate having a plurality of pores; and a porous coating layer formed on at least one surface of the porous polymer substrate and containing a plurality of inorganic particles and a binder polymer positioned on the whole or a part of the surface of the inorganic particles to connect the inorganic particles with each other and fix them, and wherein the adhesion (Peel Strength) between the porous polymer substrate and the porous coating layer and the adhesion (Lami Strength) between the porous coating layer and the electrode satisfy the following Mathematical Formula 1:

1.10≤(Peel Strength)/(Lami Strength)≤2.1 [Mathematical Formula 1]

According to the third embodiment of the present disclosure, there is provided the electrode assembly as defined in the first or the second embodiment, wherein Mathematical Formula 1 satisfies the following condition:

1.12≤(Peel Strength)/(Lami Strength)≤1.78 [Mathematical Formula 1]

According to the fourth embodiment of the present disclosure, there is provided the electrode assembly as defined in any one of the first to the third embodiments, wherein the Lami Strength is 25-300 gf/15 mm.

According to the fifth embodiment of the present disclosure, there is provided the electrode assembly as defined in any one of the first to the fourth embodiments, wherein the binder polymer is any one selected from the group consisting of polyvinylidene fluoride-co-hexafluoropropylene, polyvinylidene fluoride-co-trichloroethylene, polymethyl methacrylate, polyethylhexyl acrylate, polybutyl acrylate, polymethyl methacrylate-co-ethylhexyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a combination of two or more of them.

According to the sixth embodiment of the present disclosure, there is provided the electrode assembly as defined in any one of the first embodiment and the third to the fifth embodiments, wherein the adhesive resin is any one selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polybutyl acrylate-co-methyl methacrylate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a combination of two or more of them.

According to the seventh embodiment of the present disclosure, there is provided the electrode assembly as defined in any one of the first to the sixth embodiments, wherein the porous polymer substrate is subjected to corona discharge treatment.

According to the eighth embodiment of the present disclosure, there is provided the electrode assembly as defined in any one of the first to the seventh embodiments, wherein the weight ratio of the inorganic particles to the binder polymer is 70:30-95:5.

According to the ninth embodiment of the present disclosure, there is provided the electrode assembly as defined in any one of the first to the eighth embodiments, wherein the porous coating layer has a thickness of 1-10 μm and the adhesive layer has a thickness of 0.5-4 μm.

In another aspect of the present disclosure, there is also provided an electrochemical device according to any one of the following embodiments.

According to the tenth embodiment of the present disclosure, there is provided an electrochemical device including one or more of the electrode assembly as defined in the first or the second embodiment, and an electrolyte injected thereto.

According to the eleventh embodiment of the present disclosure, there is provided the electrochemical device as defined in the tenth embodiment, the electrochemical device being a lithium secondary battery.

Advantageous Effects

According to the embodiments of the present disclosure, it is possible to improve the resistance of a separator against scratching and to provide high adhesion between a separator and an electrode by increasing the adhesion (Peel Strength) between a porous polymer substrate and a porous coating layer to be higher than the adhesion (Lami Strength) between an electrode and the outermost surface (porous coating layer or adhesive layer) of a separator facing the electrode.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part [includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In an electrochemical device, such as a lithium secondary battery, an adhesive layer has been introduced onto a porous organic-inorganic coating layer in some cases in order to increase the adhesion between a separator and an electrode. Herein, the adhesion between a porous polymer substrate and a porous coating layer is defined as Peel Strength (Ps) and the adhesion between an electrode and the outermost surface (porous coating layer or adhesive layer) of a separator facing the electrode is defined as Lami Strength (Ls).

According to the related art, in order to further increase the adhesion between a separator and an electrode, a method for increasing the Lami Strength has been focused. In the case of Peel Strength, it is maintained merely to such a level that separation of the inorganic particles in a porous coating layer may be prevented.

However, when the loading amount of adhesive slurry is increased to increase the Lami Strength, the thickness of the adhesive layer is increased and the content of a binder polymer is also increased to cause a problem of pore blocking. Thus, the resistance of the separator itself is increased and the output characteristics are degraded undesirably.

Meanwhile, even though the Peel Strength is maintained at a predetermine level, there are problems in that the electrode and the separator are not adhered to each other, the separator surface is scratched, or the related system is contaminated with the coating layer.

To solve the above-mentioned problems, the electrode assembly according to an embodiment of the present disclosure includes two electrodes having polarities opposite to each other, and a separator interposed between the two electrodes, wherein the separator includes:

a separator base which includes a porous polymer substrate having a plurality of pores, and a porous coating layer formed on at least one surface of the porous polymer substrate and containing a plurality of inorganic particles and a binder polymer positioned on the whole or a part of the surface of the inorganic particles to connect the inorganic particles with each other and fix them; and an adhesive layer formed on at least one surface of the separator base, provided to face either of the electrodes and containing an adhesive resin, and wherein the adhesion (Peel Strength) between the porous polymer substrate and the porous coating layer and the adhesion (Lami Strength) between the adhesive layer and the electrode satisfy the following Mathematical Formula 1:

$$1.10 \leq (\text{Peel Strength})/(\text{Lami Strength}) \leq 2.1 \quad \text{[Mathematical Formula 1]}$$

In the electrode assembly according to an embodiment of the present disclosure, the adhesion (Peel strength) between the porous polymer substrate and the porous coating layer is higher than the adhesion (Lami Strength) between the adhesive layer and the electrode. In this case, the adhesion between the separator and the electrode is improved.

In the electrode assembly according to the present disclosure, Mathematical Formula 1 may be 1.10-2.1, particularly 1.12-1.78. When Mathematical Formula is less than 1.10, it is not possible to perform adhesion despite the same amount of adhesive resin loaded on the separator base. Meanwhile, when Mathematical Formula 1 is larger than 2.1, an excessive amount of polymer binder is present between the porous substrate and the porous coating layer to cause a decrease in ion conductivity and degradation of battery performance. In addition, processability may be degraded during assemblage. Particularly, it may be difficult to perform adhesion between the electrode and the separator, or the porous coating layer may be separated. Therefore, Peel Strength/Lami Strength should satisfy the above-defined range of Mathematical Formula 1.

The electrode assembly according to an embodiment of the present disclosure shows an increase in the adhesion (Lami Strength) between the adhesive layer (i.e., the outermost surface of the separator facing the electrode) and the electrode when Mathematical Formula 1 is satisfied, even though the same amount of slurry for forming an adhesive layer is coated.

As used herein, 'Peel Strength' means the adhesion between the porous substrate and the porous coating layer. Herein, Peel Strength is defined as the force required for separating the porous coating layer and the porous polymer substrate from each other, and it is determined by cutting the separator into a size of 15 mm×100 mm, attaching a double-sided adhesive tape to a glass plate so that the porous coating layer surface of the separator may be adhered to the adhesive tape, mounting the end portion of the separator to a UTM instrument, and applying force at 180° and a rate of 300 mm/min.

As used herein, 'Lami Strength' means the adhesion between the electrode and the outermost surface (porous coating layer or adhesive layer) of the separator facing either of the electrodes. Herein, Lami Strength is defined as the force required for separating the electrode and the outermost surface (porous coating layer or adhesive layer) of the separator facing either of the electrode from each other, and it is determined by preparing an anode with a size of 15 mm×100 mm and a separator with a size of 15 mm×100 mm, stacking the separator and the anode and inserting the stack between PET films having a thickness of 100 μm, carrying out adhesion by using a flat press at 90° C. and 8.5 MPa under heating for 1 second, mounting the end portion of the adhered separator and anode to a UTM instrument, and applying force at 180° and a rate of 300 mm/min.

Figure 4:
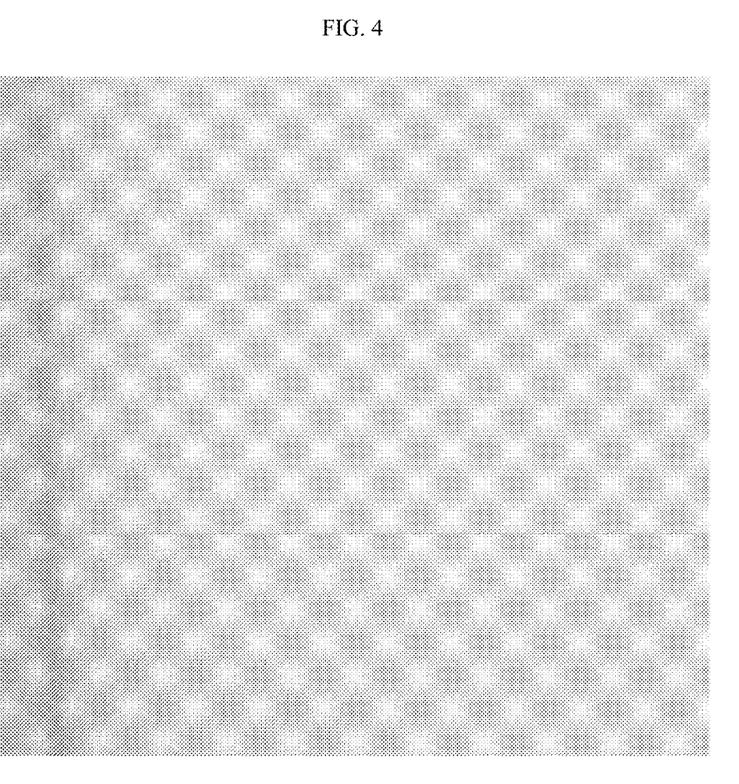
FIG. 4 is a photograph showing that no scratch phenomenon occur on the surface of the separator according to Example 1.
Figure 5:
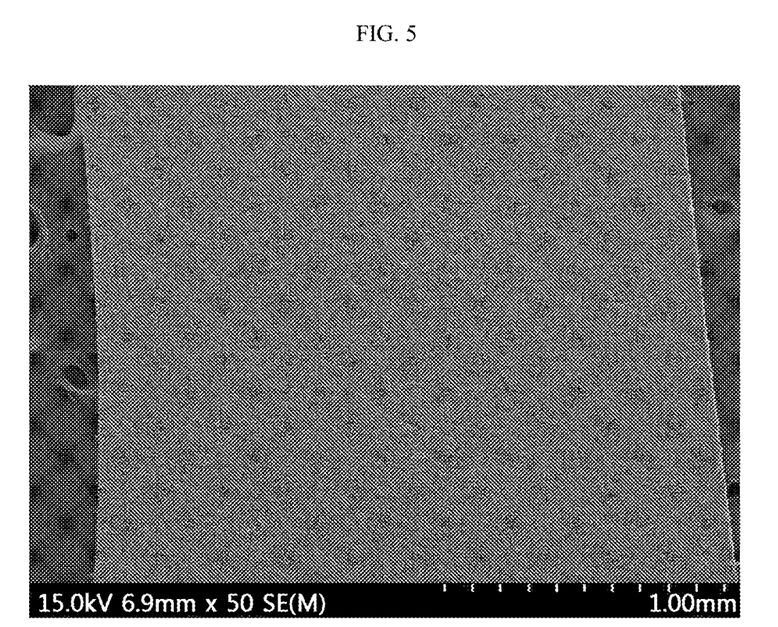
FIG. 5 shows a scanning electron microscopic (SEM) image illustrating that no scratch phenomenon exist in FIG. 4.

The electrode assembly shows an increase in scratch resistance or peeling resistance on the separator surface, when Peel Strength is higher than Lami Strength. This can be seen from FIG. 4 and FIG. 5.

According to an embodiment of the present disclosure, the adhesion (Lami Strength) between the adhesive layer and the electrode may be 25-300 gf/15 mm. When the above-defined range is satisfied, it is possible to prevent the problem of a decrease in pore size and porosity in the resultant adhesive layer and to solve the problem of degradation of peeling resistance of the adhesive layer.

The electrode assembly according to an embodiment of the present disclosure includes an adhesive layer on at least one surface of a separator base including a porous coating layer. When slurry for forming a porous coating layer is aqueous one based on an aqueous medium, an adhesive layer is further incorporated in order to improve the adhesion between the porous coating layer and the electrode.

In the electrode assembly according to an embodiment of the present disclosure, the adhesive resin used for forming an adhesive layer is any one selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polybutyl acrylate-co-methyl methacrylate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a combination of two or more of them.

The adhesive resin may be polymethyl methacrylate-co-butyl acrylate, wherein the molar ratio of methyl methacrylate to butyl acrylate may be 25:75-75:25.

According to an embodiment of the present disclosure, when the porous polymer substrate has porous coating layers on both surfaces thereof, the adhesive layer may be formed on each top surface of the porous coating layer. In addition, when a porous coating layer is formed merely on one surface of the porous polymer substrate, the adhesive layer may be formed directly on the top surface of the porous coating layer and on the other surface of the porous polymer substrate having no porous coating layer.

According to an embodiment of the present disclosure, the adhesive layer may be formed on both surfaces of the separator base.

The porous polymer substrate may be subjected to corona discharge treatment. The surface of the porous polymer substrate may be provided with hydrophilicity through corona discharge treatment. The surface treatment using corona discharge may be carried out on one surface or both surfaces of the porous polymer substrate. Particularly, when the porous coating layer is formed from aqueous slurry, corona discharge treatment can improve the wettability of the porous polymer substrate with the aqueous slurry for forming a porous coating layer.

The corona discharge is a phenomenon in which electric current flows while electrodes show a purple color when a direct current power source is applied to a conductor as an electrode and a metal plate as a counter electrode. When the porous polymer substrate is subjected to corona discharge treatment according to the present disclosure, the surface is modified to be provided with hydrophilicity and the adhesion thereof to an aqueous medium is improved. Therefore, the adhesion of the porous polymer substrate is increased through the corona discharge treatment to facilitate coating with the aqueous medium in the slurry for forming a porous coating layer.

The corona discharge treatment may be carried out by using a conventional method with no particular limitation, wherein the discharge dose may be 30-300 $Wmin/m^2$, or 50-120 $Wmin/m^2$, but is not limited thereto.

Meanwhile, the electrode assembly according to another embodiment of the present disclosure includes two electrodes having polarities opposite to each other, and a separator interposed between the two electrodes, wherein the separator includes:

a porous polymer substrate having a plurality of pores; and a porous coating layer formed on at least one surface of the porous polymer substrate and containing a plurality of inorganic particles and a binder polymer positioned on the whole or a part of the surface of the inorganic particles to connect the inorganic particles with each other and fix them, and wherein the adhesion (Peel Strength) between the porous polymer substrate and the porous coating layer and the adhesion (Lami Strength) between the porous coating layer and the electrode satisfy the following Mathematical Formula 1:

$$1.10 \leq (\text{Peel Strength})/(\text{Lami Strength}) \leq 2.1 \quad \text{[Mathematical Formula 1]}$$

In the electrode assembly according to the above embodiment of the present disclosure, when organic slurry based on an organic solvent is used for slurry for forming a porous coating layer, no adhesive layer may be required, unlike aqueous slurry. This is because the binder polymer is positioned in a larger amount on the surface portion of the porous coating layer during the application and drying of the organic slurry onto the porous substrate, and thus the adhesion between the porous coating layer and the electrode can be improved. Meanwhile, in this case, Mathematical Formula 1 may be within a range of 1.10-2.1 or 1.12-1.78.

According to the present disclosure, when the range of Mathematical Formula 1 satisfies the above-defined range regardless of the use of aqueous slurry or organic slurry, it is possible to provide an electrode assembly having excellent adhesion and increased scratch resistance of the porous coating layer formed therein.

In the electrode assembly according to an embodiment of the present disclosure, the adhesion (Lami Strength) between the porous coating layer and the electrode may be 25-300 gf/15 mm. When the above-defined range is satisfied, it is possible to prevent the problem of a decrease in pore size and porosity of the porous coating layer, and to solve the problem of degradation of peeling resistance of the porous coating layer.

In the electrode assembly according to the present disclosure, the porous polymer substrate may be a porous polymer film substrate or a porous polymer nonwoven web substrate.

The porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins In addition, although there is no particular limitation in the thickness of the porous polymer substrate, the porous polymer substrate has a thickness of 1-100 µm, particularly 5-50 µm. Although there is no particular limitation in the size of the pores present in the porous polymer substrate and porosity, the pore size and porosity may be 0.01-50 µm and 0.1-95%, respectively.

In the electrode assembly according to an embodiment of the present disclosure, there is no particular limitation in the inorganic particles used for forming a porous coating layer, as long as they are electrochemically stable. In other words, there is no particular limitation in the inorganic particles that may be used herein, as long as they cause no oxidation and/or reduction in the range (e.g. 0-5V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, inorganic particles having lithium ion transportability or a combination thereof.

The inorganic particles having a dielectric constant of 5 or more may include any one selected from the group consisting of $Al_2O_3$, $SiO_2$, $ZrO_2$, AlOOH, $TiO_2$, $BaTiO_3$, Pb(Zr,Ti)$O_3$ (PZT, wherein 0<x<1), $Pb_{1-x}La_xZr_{1-y}Ti_yO_3$ (PLZT, wherein 0<x<1, 0<y<1), $(1-x)Pb(Mg_{1/2}Nb_{2/3})O_3-xPbTiO_3$ (PMN-PT, wherein 0<x<1), hafnia ($HfO_2$), $SrTiO_3$, $SnO_2$, $CeO_2$, MgO, NiO, CaO, ZnO, $ZO_3$ and SiC, or a mixture of two or more of them.

The inorganic particles having lithium ion transportability may be any one selected from the group consisting of include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (1<x<4, 0<y<13), such as $14Li_2O-9Al_2O_3-38TiO_2-39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$-based glass ($Li_xSi_yS_z$, 0<x<3, 0<y<2, 0<z<4) and $P_2S_5$-based glass ($Li_xP_yS_z$, 0<x<3, 0<y<3, 0<z<7), or a combination of two or more of them.

In addition, there is no particular limitation in the average particle diameter of the inorganic particles. However, the inorganic particles preferably have an average particle diameter of 0.001-10 µm in order to form a coating layer with a uniform thickness and to provide suitable porosity.

In the electrode assembly according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 MPa$^{1/2}$ or 15-25 MPa$^{1/2}$ and 30-45 MPa$^{1/2}$. Therefore, hydrophilic polymers having many polar groups may be used more frequently as compared to hydrophobic polymers, such as polyolefins. When the solubility parameter is less than 15 MPa$^{1/2}$ and more than 45 MPa$^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

The weight ratio of the inorganic particles to the binder polymer may be 50:50-99:1, particularly 70:30-95:5. When the weight ratio of the inorganic particles to the binder polymer satisfies the above-defined range, the content of the binder polymer is increased to prevent a decrease in pore size and porosity of the resultant coating layer and to solve the problem of degradation of peeling resistance of the resultant coating layer caused by a decreased content of binder polymer.

The electrode assembly according to an embodiment of the present disclosure may further include other additives as ingredients of the porous coating layer, besides the inorganic particles and binder polymer.

Although there is no particular limitation in the thickness of the porous coating layer, the porous coating layer may have a thickness of 1-10 µm, particularly 1.5-6 µm. In addition, the porous coating layer preferably has a porosity of 35-65% but is not limited thereto.

According to an embodiment of the present disclosure, the porous coating layer may be an oil-based coating layer using organic slurry based on an organic solvent or an aqueous slurry-derived aqueous coating layer using water as a solvent. In the case of the aqueous coating layer, it is advisable in that it facilitates thin film coating and reduces the resistance of a separator.

The electrode assembly according to an embodiment of the present disclosure may be obtained by a method used currently in the art. According to an embodiment of the present disclosure, slurry for forming a porous coating layer containing inorganic particles dispersed in a polymer dispersion including a binder polymer dispersed in a solvent is applied to and dried on a porous substrate to obtain a separator base having a porous coating layer. Next, slurry for forming an adhesive layer containing an adhesive resin dispersed in a solvent is applied to and dried on at least one surface of the separator base and onto the porous coating layer to form an adhesive layer. To apply the slurry for forming an adhesive layer, a slot coating process or dip coating process is used preferably. In this case, when forming the slurry for forming a porous coating layer, the content of the inorganic particles and that of the binder polymer may be controlled to obtain an electrode assembly wherein the adhesion (Peel Strength) between the porous polymer substrate and the porous coating layer and the adhesion (Lami Strength) between the adhesive layer and the electrode satisfy the above Mathematical Formula 1. According to a particular embodiment of the present disclosure, it is possible to increase Peel Strength by increasing the content of the binder polymer. In a variant, when the slurry for forming a porous coating layer is aqueous slurry based on an aqueous solvent, it is possible to increase Peel Strength by subjecting the porous substrate to hydrophilic treatment, such as corona discharge or plasma discharge. According to a particular embodiment, it is possible to increase Peel Strength by increasing the pressing strength between the separator and the electrode, temperature, time or the like. In addition, it is possible to increase Peel Strength by varying the type of the binder polymer used for the porous coating layer or the loading amount of the binder polymer or adhesive resin. Herein, the solvent preferably has a solubility parameter similar to the solubility parameter of the binder polymer to be used and has a low boiling point. This is intended to facilitate homogeneous mixing and the subsequent solvent removal. Non-limiting examples of the solvent that may be used include any one selected from water, acetone, tetrahydrofuran, methylene chloride, chloroform, dimethyl formamide, N-methyl-2-pyrrolidone, methyl ethyl ketone and cyclohexane, or a combination of two or more of them.

The electrode assembly according to another embodiment of the present disclosure may be obtained by a method used currently in the art. According to an embodiment of the present disclosure, slurry for forming a porous coating layer containing inorganic particles dispersed in a polymer dispersion including a binder polymer dispersed in a solvent is applied to and dried on a porous substrate to form a porous coating layer. When forming the porous coating layer, relative humidity, the content of the inorganic particles, that of the binder polymer, etc. may be controlled to obtain an electrode assembly wherein the adhesion (Peel Strength) between the porous polymer substrate and the porous coating layer and the adhesion (Lami Strength) between the adhesive layer and the electrode satisfy the above Mathematical Formula 1. According to a particular embodiment of the present disclosure, it is possible to increase Peel Strength by increasing the content of the binder polymer. According to another particular embodiment of the present disclosure, it is possible to increase Peel Strength by reducing relative humidity when forming the porous coating layer. According to still another particular embodiment of the present disclosure, it is possible to increase Peel Strength by increasing the content of the binder polymer and reducing relative humidity at the same time. According to still another particular embodiment of the present disclosure, it is possible to increase Peel Strength by reducing the speed, reducing air volume and by reducing temperature when forming the porous coating layer. According to yet another particular embodiment, it is possible to increase Peel Strength by increasing the pressing strength between the separator and the electrode, temperature, time or the like. Herein, the solvent preferably has a solubility parameter similar to the solubility parameter of the binder polymer to be used and has a low boiling point. This is intended to facilitate homogeneous mixing and the subsequent solvent removal. Non-limiting examples of the solvent that may be used include any one selected from water, acetone, tetrahydrofuran, methylene chloride, chloroform, dimethyl formamide, N-methyl-2-pyrrolidone, methyl ethyl ketone and cyclohexane, or a combination of two or more of them.

Although there is no particular limitation in the process for coating the composition for forming a porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the composition for forming a porous coating layer is dried by using a dryer, such as an oven, thereby forming porous coating layers on at least one surface of the porous substrate.

In the porous coating layers, the inorganic particles are bound among themselves by the binder polymer while they are packed and are in contact with each other. Thus, interstitial volumes are formed among the inorganic particles and the interstitial volumes become vacant spaces to form pores.

In other words, the binder polymer attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space may be defined by the inorganic particles facing each other substantially in a closely packed or densely packed structure of the inorganic particles.

The electrochemical device according to still another embodiment of the present disclosure includes an electrode assembly to which an electrolyte is injected, wherein the electrode assembly is the above-described electrode assembly according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1) Manufacture of Anode

Artificial graphite, carbon black, carboxymethyl cellulose (CMC) and a binder were mixed with water at a weight ratio of 95.8:1:1.2:2 to form anode slurry. The anode slurry was applied onto copper (Cu) foil to a thickness of 50 μm to form a thin electrode plate, which, in turn, was dried at 135° C. for 3 hours or more and subjected to pressing, thereby providing an anode.

2) Manufacture of Cathode

A cathode active material ($LiCoO_2$), a conductive material (carbon black) and a binder (PVdF) were introduced to N-methyl-2-pyrrolidone (NMP) at a weight ratio of 96:2:2 and mixed to form cathode slurry. The resultant cathode slurry was applied to an aluminum foil as a cathode current collector having a thickness of 20 μm to a capacity of 3.1 mAh/cm², thereby providing a cathode.

3) Manufacture of Separator Base

At room temperature, $Al_2O_3$ as inorganic particles (Japanese Light Metal Co., LS235, particle size 500 nm) and the following binder polymer were introduced to water and agitated to prepare uniform dispersed slurry. The binder polymer used herein includes carboxymethyl cellulose (CMC) and an acrylic binder. The acrylic binder was a copolymer polymerized from methyl methacrylate and ethylhexyl acrylate at a molar ratio of 25:75. The weight ratio of CMC to the acrylic binder was 30:70. Particularly, CMC was introduced to water and agitated homogeneously, and then the acrylic binder and inorganic particles were introduced sequentially to prepare slurry for forming a porous coating layer. In the slurry, the inorganic particles and the binder polymer were used at a weight ratio of 93.5:6.5. The slurry was applied to one surface of a polyethylene porous substrate (W scope Co., WL11B, air permeation time 150 sec/100 cc) by using a doctor blade and then dried to obtain a separator base having a porous coating layer. The porous coating layer had a thickness of 4 μm.

4) Adhesive Layer Coating

Slurry for forming an adhesive layer including adhesive polymer particles (LP25, Zeon, adhesive polymer particles including a copolymer of butyl acrylate with methyl methacrylate) dispersed homogeneously in water was applied to the surface of the separator base obtained from 3) and then dried to form an adhesive layer. In the slurry for forming an adhesive layer, the adhesive resin particles were used at a concentration of 5 wt %. The slurry for forming an adhesive layer was applied to the porous coating layer of the separator obtained from 3) in an amount of 1.0 g/m², and then dried to form an adhesive layer on the surface of the separator base.

5) Adhesion of Separator with Electrode

Then, the separator and an electrode were stacked successively so that the adhesive layer might face the anode active material layer of the electrode of 1), and then pressing was carried out at a temperature of 90° C. under 8.5 MPa for 1 second to obtain an electrode assembly including a stack of the separator with an anode.

Comparative Example 1

An electrode assembly was obtained in the same manner as Example 1, except that the weight ratio of the inorganic particles to the binder in the slurry for forming a porous coating layer was 97:3.

Example 2

1) A cathode and 2) an anode were obtained in the same manner as Example 1.

3) Manufacture of Separator

PVdF-HFP and cyanoethylpolyvinyl alcohol were mixed at a weight ratio of 85:15 and the resultant mixture was added to acetone and dissolved therein at 50° C. for about 12 hours to obtain a polymer binder solution. $Al_2O_3$ inorganic particles were added to the resultant polymer binder solution. Herein, the weight ratio of the inorganic particles to the polymer binder was 85:15. The polymer binder solution containing the inorganic particles added thereto was introduced to a bead mill to pulverize and disperse the inorganic particles for 3 hours to obtain slurry for forming a porous coating layer.

The slurry for forming a porous coating layer was applied to both surface of a polyolefin porous polymer substrate having a thickness of 7 μm through a dip coating process. Then, drying was carried out in an oven at 70° C. while maintaining a relative humidity of 40% to obtain a separator.

4) Adhesion of Separator with Electrode

Then, the separator and an electrode were stacked successively so that the adhesive layer might face the anode active material layer of the electrode of 1), and then pressing was carried out at a temperature of 90° C. under 8.5 MPa for 1 second to obtain an electrode assembly including a stack of the separator with an anode.

Comparative Example 2

An electrode assembly was obtained in the same manner as Example 2, except that a relative humidity of 65% was maintained during the coating of the porous coating layer.

Example 3

An electrode assembly was obtained in the same manner as Example 2, except that the weight ratio of the inorganic particles to the binder polymer in the slurry for forming a porous coating layer was 89.5:10.5. A relative humidity of 40% was maintained during the coating of the porous coating layer.

Comparative Example 3

An electrode assembly was obtained in the same manner as Example 2, except that the weight ratio of the inorganic particles to the binder polymer in the slurry for forming a porous coating layer was 89.5:10.5 and the loading amount of the adhesive resin was increased.

Evaluation of Adhesion

1) Comparison of Interfacial Adhesion

Each of the electrode assemblies according to Examples 1-3 and Comparative Examples 1-3 was used to determine the adhesion (Peel Strength) between the porous polymer substrate and the porous coating layer and the adhesion (Lami Strength) between the electrode and the outermost surface (porous coating layer or adhesive layer) of the separator facing the electrode. The results are shown in the following Table 1.

The determination method is as follows.

Determination of Peel Strength: Each of the separators according to Examples 1-3 and Comparative Examples 1-3 was cut into a size of 15 mm×100 mm. A double-sided tape was attached to a glass plate and the separator was attached thereto so that the porous coating layer surface might be adhered to the adhesive tape. Then, the end of the adhered separator was mounted to a UTM instrument (LLOYD Instrument LF Plus) and the force required for separating the porous coating layer and the porous polymer substrate from each other was determined by applying force at 180° and a rate of 300 mm/min.

Determination of Lami Strength: An anode was manufactured in the same manner as Example 1-1) and cut into a size of 15 mm×100 mm. Each of the separators according to Examples 1-3 and Comparative Examples 1-3 was cut into a size of 15 mm×100 mm. The prepared separator and anode were stacked successively, the resultant stack was inserted between PET films of 100 μm, and then adhesion was carried out by using a flat press. Herein, the flat press was used at 90° C. and 8.5 MPa under heating for 1 second. The end of the adhered separator and anode was mounted to a UTM instrument (LLOYD Instrument LF Plus) and the force required for separating the anode and the outermost surface (adhesive layer or porous coating layer) of the separator facing the anode from each other was determined by applying force at 180° and a rate of 300 mm/min.

TABLE 1

|  | Ex. 1 | Comp. Ex. 1 | Ex. 2 | Comp. Ex. 2 | Ex. 3 | Comp. Ex. 3 |
| --- | --- | --- | --- | --- | --- | --- |
| Adhesive resin loading amount (g/m²) | 1.0 | 1.0 | 0.5 | 0.5 | 0.3 | 1.4 |
| Peel (gf/15 mm) | 65 | 20 | 80 | 30 | 28 | 34 |
| Lami(gf/15 mm) | 50 | 25 | 45 | 35 | 25 | 14 |
| P/L | 1.3 | 0.8 | 1.78 | 0.86 | 1.12 | 2.43 |
| Inorganic particles:binder ratio(wt %) | 93.5:6.5 | 97:3 | 85:15 | 85:15 | 89.5:10.5 | 89.5:10.5 |
| Porous coating layer slurry | Aqueous slurry | Aqueous slurry | Organic slurry | Organic slurry | Organic slurry | Organic slurry |
| Humidity | — | — | 40 | 65 | 40 | 40 |
| Issue |  | No adhesion |  | Coating layer scratched |  | Poor processability of assemblage |

As can be seen from Table 1, in the case of Examples 1-3, the adhesion between the porous coating layer and the porous polymer substrate is higher than the adhesion between the porous coating layer and the electrode. On the contrary, Comparative Examples 1-3 show the opposite tendency to Examples 1-3. Thus, in the case of Comparative Examples 1-3, adhesion with the electrode is not allowed, the coating layer is scratched and processability of assemblage is poor. As a result, each of Comparative Examples 1-3 is not suitable for a separator for an electrochemical device.

What is claimed is:

1. An electrode assembly comprising two electrodes having polarities opposite to each other, and a separator interposed between the two electrodes, wherein the separator comprises:

a separator base which comprises a porous polymer substrate having a plurality of pores, and a porous coating layer on at least one surface of the porous polymer substrate and containing a plurality of inorganic particles and a binder polymer on the whole or a part of the surface of the inorganic particles to connect the inorganic particles with each other and fix them; and an adhesive layer on at least one surface of the separator base to face either of the electrodes and containing an adhesive resin, and wherein a Peel Strength adhesion between the porous polymer substrate and the porous coating layer and a Lami Strength adhesion between the adhesive layer and the electrode satisfy:

1.10≤(Peel Strength)/(Lami Strength)≤2.1, a weight ratio of the inorganic particles to the binder polymer is 70:30-95:5, and the adhesive resin includes one selected from the group consisting of polyvinylidene fluoride-co-hexafluoropropylene, polyvinylidene fluoride-co-trichloroethylene, polyacrylonitrile, polyvinyl pyrrolidone, polyvinyl acetate, polyethylene-co-vinyl acetate, polybutyl acrylate-co-methyl methacrylate, polyethylene oxide, polyarylate, cyanoethylpullulan, cyanoethylpolyvinylalchol, cyanoethyl sucrose, pullulan and a combination of two or more of them.

2. An electrode assembly comprising two electrodes having polarities opposite to each other, and a separator interposed between the two electrodes, wherein the separator consisting of:

a porous polymer substrate having a plurality of pores; and a porous coating layer on at least one surface of the porous polymer substrate and containing a plurality of inorganic particles and a binder polymer on the whole or a part of the surface of the inorganic particles to connect the inorganic particles with each other and fix them, and wherein the Peel Strength adhesion between the porous polymer substrate and the porous coating layer and the Lami Strength adhesion between the porous coating layer and the electrode satisfy:

1.10≤(Peel Strength)/(Lami Strength)≤2.1, and wherein the weight ratio of the inorganic particles to the binder polymer is 70:30-95:5.

3. The electrode assembly according to claim 1, wherein the Peel Strength adhesion between the porous polymer substrate and the porous coating layer and the Lami Strength adhesion between the porous coating layer and the electrode satisfies:

1.12≤(Peel Strength)/(Lami Strength)≤1.78.

4. The electrode assembly according to claim 1, wherein the Lami Strength adhesion is 25-300 gf/15 mm.

5. The electrode assembly according to claim 1, wherein the binder polymer is any one selected from the group consisting of polyvinylidene fluoride-co-hexafluoropropylene, polyvinylidene fluoride-co-trichloroethylene, polymethyl methacrylate, polyethylhexyl acrylate, polybutyl acrylate, polymethyl methacrylate-co-ethylhexyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, and a combination of two or more of them.

6. The electrode assembly according to claim 1, wherein the porous polymer substrate is treated by corona discharge treatment.

7. The electrode assembly according to claim 1, wherein the porous coating layer has a thickness of 1-10 µm, and the adhesive layer has a thickness of 0.5-4 µm.

8. An electrochemical device comprising one or more of the electrode assembly as defined claim 1 and an electrolyte injected thereto.

9. The electrochemical device according to claim 8, which is a lithium secondary battery.

10. The electrode assembly according to claim 1, wherein the porous coating layer is disposed on both surfaces of the porous polymer substrate.

11. The electrode assembly according to claim 1, wherein the porous coating layer is prepared from a homogeneous mixture comprising the inorganic particles, the binder polymer and a solvent selected from the group consisting of water, acetone, tetrahydrofuran, methylene chloride, cyclohexane, and a combination of two or more thereof.

12. The electrode assembly according to claim 1, wherein the porous polymer substrate comprises one selected from the group consisting of polyethylene, polypropylene, polybutylene, polypentene, and a combination of two or more of them.

13. The electrode assembly according to claim 1, wherein the plurality of inorganic particles is selected from the group consisting of $Al_2O_3$, $SiO_2$, $ZrO_2$, AlOOH, $TiO_2$, $BaTiO_3$, $Pb(Zr,Ti)O_3$ (PZT, wherein 0<x<1), $Pb_{1-x}La_xZr_{1-y}Ti_yO_3$ (PLZT, wherein 0<x<1, 0<y<1), $(1-x)Pb(Mg_{1/2}Nb_{2/3})O_{3-x}PbTiO_3$ (PMN-PT, wherein 0<x<1), hafnia ($HfO_2$), $SrTiO_3$, $SnO_2$, $CeO_2$, MgO, NiO, CaO, ZnO, $ZO_3$, SiC, and a mixture of two or more of them.

14. An electrode assembly comprising two electrodes having polarities opposite to each other, and a separator interposed between the two electrodes, wherein the separator comprises:

a separator base comprising a porous polymer substrate having a plurality of pores, and a porous coating layer on at least one surface of the porous polymer substrate and containing a plurality of inorganic particles and a binder polymer on the whole or a part of the surface of the inorganic particles, wherein a weight ratio of the inorganic particles to the binder polymer is 70:30-95:5 an adhesive layer on at least one surface of the separator base to face either of the electrodes and containing an adhesive resin.

15. The electrode assembly according to claim 14, wherein the binder polymer is any one selected from the group consisting of polyvinylidene fluoride-co-hexafluoropropylene, polyvinylidene fluoride-co-trichloroethylene, polymethyl methacrylate, polyethylhexyl acrylate, polybutyl acrylate, polymethyl methacrylate-co-ethylhexyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, and a combination of two or more of them.

16. The electrode assembly according to claim 14, wherein the adhesive resin is any one selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polybutyl acrylate-co-methyl methacrylate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, and a combination of two or more of them.

17. The electrode assembly according to claim 14, wherein the plurality of inorganic particles is selected from the group consisting of $Al_2O_3$, $SiO_2$, $ZrO_2$, AlOOH, $TiO_2$, $BaTiO_3$, $Pb(Zr,Ti)O_3$ (PZT, wherein 0<x<1), $Pb_{1-x}La_xZr_{1-y}Ti_yO_3$(PLZT, wherein 0<x<1, 0<y<1), $(1-x)Pb(Mg_{1/2}Nb_{2/3})O_{3-x}PbTiO_3$(PMN-PT, wherein 0<x<1), hafnia ($HfO_2$), $SrTiO_3$, $SnO_2$, $CeO_2$, MgO, NiO, CaO, ZnO, $ZO_3$, SiC, and a mixture of two or more of them.

18. The electrode assembly according to claim 14, wherein the porous polymer substrate comprises one selected from the group consisting of polyethylene, polypropylene, polybutylene, polypentene, and a combination of two or more of them.

19. The electrode assembly according to claim 1, wherein the weight ratio of the inorganic particles to the binder polymer is 70:30-89.5: 10.5.

\* \* \* \* \*